United States Patent [19]

Lichon

[11] Patent Number: 5,464,961
[45] Date of Patent: Nov. 7, 1995

[54] ARCJET ANODE

[75] Inventor: Paul G. Lichon, Bothell, Wash.

[73] Assignee: Olin Corporation, Redmond, Wash.

[21] Appl. No.: 120,615

[22] Filed: Sep. 10, 1993

[51] Int. Cl.$^6$ ................................................ B23K 10/00
[52] U.S. Cl. .............. 219/121.52; 219/121.48; 219/121.5; 219/121.49; 60/203.1
[58] Field of Search .................. 219/121.52, 121.48, 219/121.51, 121.5, 75, 121.49; 313/231.31, 231.41, 231.51; 60/203.1

[56] References Cited

U.S. PATENT DOCUMENTS

| | | |
|---|---|---|
| 2,862,099 | 6/1957 | Gage. |
| 3,192,427 | 6/1962 | Sugawara et al.. |
| 4,548,033 | 10/1985 | Cann. |
| 4,581,516 | 4/1986 | Hatch et al.. |
| 4,710,607 | 12/1987 | Wilhelmi et al. .................. 219/121.52 |
| 4,800,716 | 1/1989 | Smith et al.. |
| 4,816,205 | 3/1989 | Gallix. |
| 4,861,962 | 8/1989 | Sanders et al.. |
| 4,882,465 | 11/1989 | Smith et al.. |
| 4,896,017 | 1/1990 | Koppel et al.. |
| 4,902,871 | 2/1990 | Sanders et al.. |
| 4,908,182 | 3/1990 | Whang. |
| 4,926,631 | 5/1990 | Smith et al.. |
| 4,992,642 | 2/1991 | Kemp et al.. |
| 4,995,231 | 2/1991 | Smith et al.. |
| 5,004,888 | 4/1991 | Wolf et al.. |
| 5,076,051 | 12/1991 | Naff. |
| 5,133,242 | 7/1992 | Witt ............................................. 124/3 |
| 5,147,998 | 9/1992 | Tsantrizos et al. .................. 219/121.5 |
| 5,225,652 | 7/1993 | Landes ............................... 219/121.47 |

OTHER PUBLICATIONS

Advanced Materials & Processes Sep. 1992, Whiienaur, Nieh & Wadsworth entitled "Tungsten and its Alloys" at pp. 28–32.

Metals Handbook. Vol. 2. Properties and Selection: Nonferrous Alloys and Special–Purpose Materials (1990) at pp. 577–581.

Primary Examiner—Mark H. Paschall
Attorney, Agent, or Firm—Gregory S. Rosenblatt

[57] ABSTRACT

There is disclosed an anode for an arcjet thruster which resists erosion during start-up on constriction during steady-state operation. The anode includes a converging upstream portion, a diverging downstream portion and a constricted portion disposed therebetween. In one embodiment of the invention, rails formed in the constricted portion accelerate the passage of an arc during start-up reducing erosion. In a second embodiment, a higher strength material resists bulging as a result of the thermal gradient within the nozzle.

15 Claims, 4 Drawing Sheets

ARCJET ANODE

STATEMENT AS TO RIGHTS

The invention described herein was made in the performance of work under NASA Contract No. NAS3-26055 and is subject to the provisions of Section 305 of the National Aeronautics and Space Act of 1958 (42 U.S.C. 2457).

BACKGROUND OF THE INVENTION

The present invention relates to small propulsion systems for maneuvering space craft and, more particularly, to electrothermal arcjet thrusters having an improved anode.

An electrothermal arcjet thruster converts electrical energy to thermal energy by heat transfer from an arc discharge to a flowing propellant and from thermal energy to directed kinetic energy by expansion of the heated propellant through a nozzle. The electrothermal arcjet thruster is described in more detail in U.S. Pat. No. 4,548,033, to Cann, U.S. Pat. No. 4,800,716 to W. W. Smith et al., and U.S. Pat. No. 4,926,632 to R. D. Smith et al., all of which are incorporated, by reference, in their entireties herein.

Most electrothermal arcjet thrusters have as common features an anode in the form of a nozzle and a cathode in the form of cylindrical rod with a conical tip. The anode has an arc chamber defined by a constrictor in a rearward portion of the body and a nozzle in a forward portion thereof. The cathode rod is aligned on the longitudinal axis of the anode with its conical tip extending into the upstream end of the arc chamber in spaced relation to the constrictor so as to define a gap therebetween.

An electric arc is initiated between the cathode rod and the anode at the entrance to the constrictor. The arc is forced downstream through the constrictor by pressurized flow of a propellant gas. The arc stabilizes and attaches at the nozzle. The propellant gas is heated in the region of the constrictor and the region of arc attachment at the mouth of the nozzle. The superheated gas is then exhausted out the nozzle to achieve thrust.

Historically, pure propellants, typically ammonia ($NH_3$) or hydrogen ($H_2$) have been used in electrothermal arcjet thrusters. More recently, hydrazine ($N_2H_4$) has been used as a propellant in arcjet thrusters. Propellants such as ammonia and hydrazine are storable in space as a liquid without refrigeration, while cryogenic propellants such as hydrogen and helium are not.

The 1500–2000 watt arcjet base propulsion devices are typically limited to approximately 550 seconds of specific impulse. Specific impulse is defined as the generated thrust (in pounds force) divided by the propellant consumption (pounds mass per second). Beyond a specific impulse of 550 seconds, the constrictor diameter reduces deteriorating thrust performance.

Applicant has determined that the reduction in the diameter of the constrictor is due both to the erosive action of the arc upstream of the constrictor during initiation and to the thermal gradient between the constrictor region and nozzle body radially outward from the constrictor during operation. While means have been proposed to limit the erosive effect of the plasma gas, as in U.S. Pat. No. 2,862,009 to Gage, which discloses a shielding gas passing between the plasma gas and the nozzle to keep the plasma flame from impacting the nozzle, such solutions have not proved adequate to sufficiently enhance the performance of spaceship propulsion units.

SUMMARY OF THE INVENTION

Accordingly, it is an object of the invention to provide an arcjet thruster having an anode which resists erosive arc wear and diameter constriction. It is a feature of the invention that rails formed in the constrictor conduct the arc into an expanded portion of the nozzle during arc initiation reducing the erosive effect of the arc on the constrictor. Another feature of the invention is that by changing the thermal and mechanical properties of the constrictor, reduction in the diameter of the constrictor is minimized.

It is an advantage of the invention that by enhancing the anode, the operational lifetime of the arcjet thruster is increased. It is an additional advantage of the invention that by maintaining a consistent diameter, the performance of the thruster is more consistent at a higher level of performance.

In accordance with a first embodiment of the invention, there is provided an anode for an arcjet thruster. The anode includes a converging upstream portion, a diverging downstream portion and a constricted region disposed between the upstream portion and the downstream portion. The constricted portion has at least one conductive rail effective to preferentially receive an arc.

In a second embodiment of the invention, there is provided an anode for an arcjet thruster. The anode includes a converging upstream portion, a diverging downstream portion, and a constricted region disposed between the upstream portion and the downstream portion. Bulging due to the thermal gradient of the constricted region is minimized.

The above stated objects, features and advantages will become more apparent from the specification and drawings which follow.

IN THE DRAWINGS

IN THE SPECIFICATION

Figure 1:
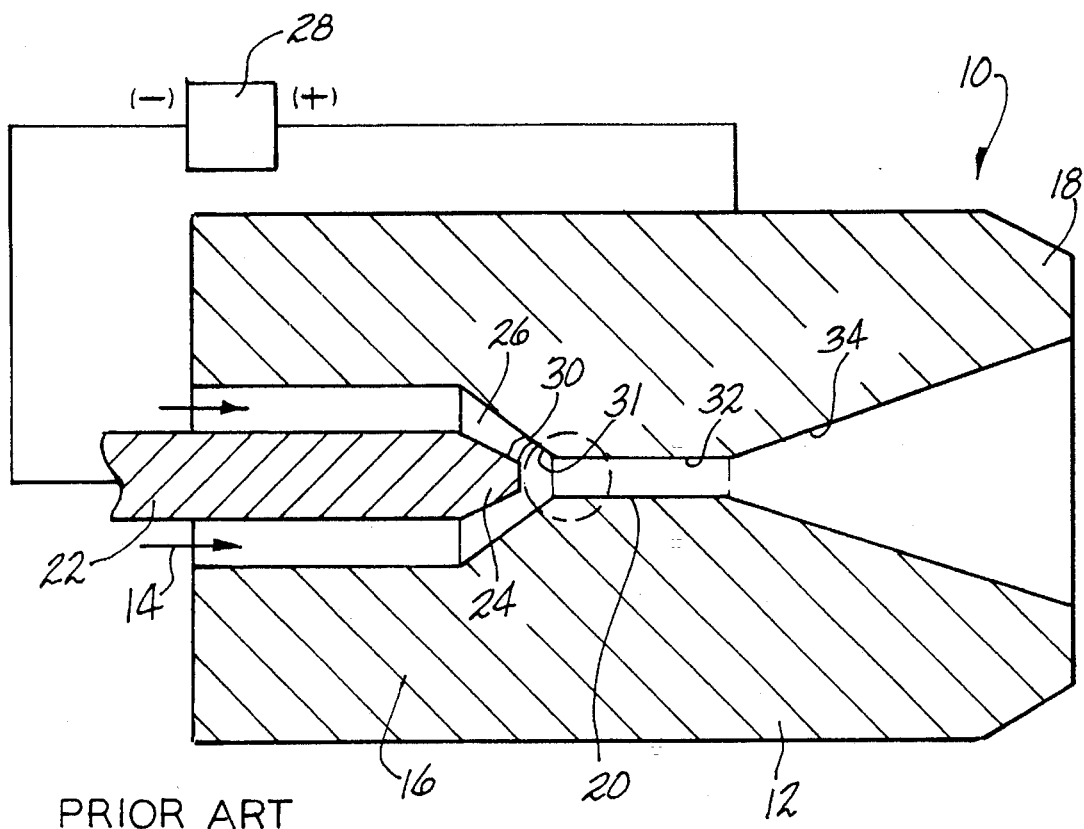
FIG. 1 shows in cross-sectional representation an arcjet thruster as known from the prior art.

FIG. 1 shows in cross-sectional representation, a portion of a constricted arc geometry electrothermal arcjet thruster 10 as known from the prior art. The electrothermal arcjet thruster 10 includes an anode 12 in the form of a cylindrical body composed of an electrically conductive metal. Typically, the anode 12 is formed from water cooled copper, tungsten, or alloys thereof. The anode 12 includes portions defined by the direction of flow of a propellant gas 14 as indicated by arrows. The anode 12 has a converging upstream portion 16 and a diverging downstream portion 18. A constricted region 20 is disposed between the converging upstream portion 16 and diverging downstream portion 18. The constricted region 20 is any length from an intersecting point to a length of about 0.5–0.76 mm (0.02–0.03 inches). Generally, the diameter of the constricted region is on the order of from about 0.381 mm to about 0.635 mm (0.015–0.025 inches).

A cathode 22 in the form of a cylindrical body composed of an electrically conductive metal having a conical tip 24 is inserted in the converging upstream portion 16 of the anode 12 with the conical tip 24 in spaced relationship to the constricted region 20 to define a gap 26. Typically, the cathode 22 is formed from tungsten or a tungsten alloy.

A power controller 28 is electrically connected between the anode 12 and the cathode 22 and is operable in a known manner for establishing an electrical potential between the anode 12 and cathode 14 with the anode 12 being positive and the cathode 14 being negative. The voltage potential is sufficient to generate an arc 30 across the gap 26. Generally, for an electrothermal arcjet thruster having a hydrazine propellant gas, a voltage potential from about 3,000 to about 4,000 volts is required to initiate the arc. Initial arc attachment is on the surface 31 of the converging upstream portion 16. The arc 30 is forced downstream along the surface 31 into and through the constricted region 20 by the flow of the propellant gas 14 and then into the diverging downstream portion 18 where the arc 30 stabilizes on a surface 34. For thrusters of high specific impulse, the duration of time for the arc to transition from the converging upstream portion to the diverging downstream portion surface 34 increases. This increase in time allows for increased energy deposition into the converging upstream portion 16.

Figure 2:
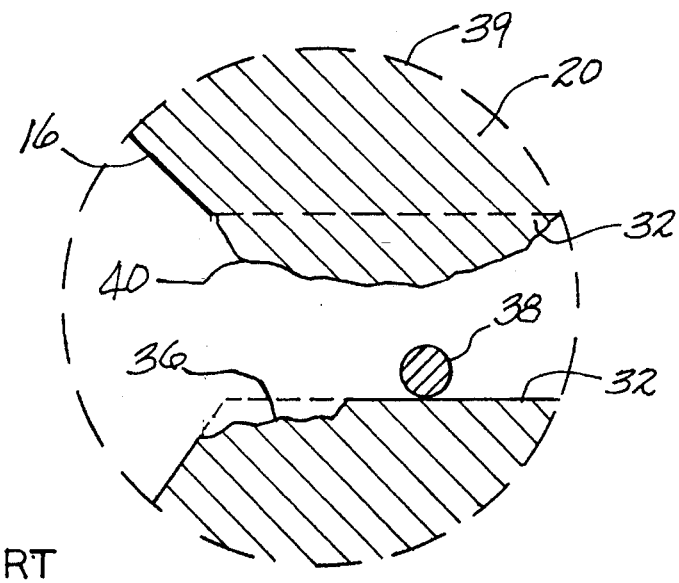
FIG. 2 shows in magnified cross-sectional representation, mechanisms by which the constrictor diameter is reduced in the prior art.

The increased energy deposition and the high temperatures of the generated plasma during operation contribute to undesirable reduction of the diameter of the constricted portion 20. This reduction is illustrated in FIG. 2, a magnified view of the dashed circle portion of FIG. 1. FIG. 2 shows the intersection of the converging upstream portion 16 and the constricted portion 20. A first mechanism for the reduction in the diameter of the constricted portion 20 is arc erosion. As the arc travels down the converging upstream portion 16 and into the constricted portion 20, the arc is highly collimated and at a relatively low voltage, typically less than 50 volts. The arc has a current of about 6–12 amps. The highly concentrated arc attachment causes erosion tracks 36 on the surface 32 of the constricted region 20. Material removed from erosion tracks 36 accumulates as erosion debris 38 adhering to the surface 32 of the constricted region 20. Erosion debris extends into the constricted region 20 decreasing the effective diameter.

Another mechanism reducing the diameter of the constricted region 20 is non-uniform thermal expansion. During steady-state operation of the arcjet thruster, the constricted region 20 is at a higher temperature than the solid body 39 disposed radially outward from the constrictor surface 32. As a result, the constricted region 20 expands due to the coefficient of thermal expansion more than the solid body portion 39. This difference in expansion generates a stress between the solid portion 39 and constricted region 20. When the stress generated by the coefficient of thermal expansion exceeds the yield stress of the metal forming the anode, radially inward movement of the material causes a bulge 40 decreasing the effective diameter of the constricted region 20. In addition, if the stress level is sufficiently high, but below the yield stress of the material, long term creep of the material will result in a similar bulge 40.

Figure 3:
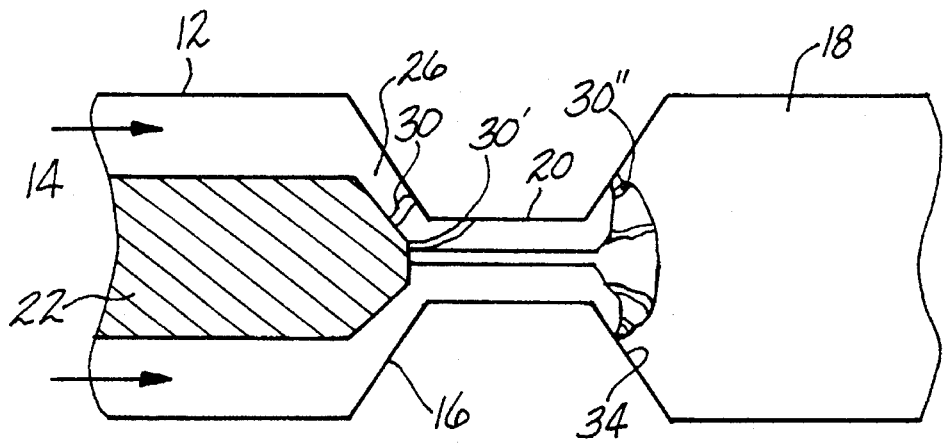
FIG. 3 shows in cross-sectional representation, the arc position during start-up as known from the prior art.

The progression of the arc during startup is illustrated in FIG. 3. When sufficient voltage is applied across the cathode 22 and the anode 12, an arc 30 is generated. For a typical gap distance of about 0.51 mm (0.02 inch) with a hydrazine gas propellant at a pressure of 3.5 kg/cm$^2$ (50 psi), the paschen breakdown voltage is in the range of about 3,000 to about 4,000 volts. The hydrazine propellant gas 14 forces the arc 30 into the constricted portion 20 of the anode 12. The arc 30' in this transition period is at a voltage potential of less than about 50 volts. It is during this stage that arcjet start erosion occurs most often. The arc is highly collimated as it transits through the transition point between the converging upstream portion 16 and the constricted portion 20. Extended duration of the arc 30' in this area is called the "low mode" and results in an erosive concentration of arc 30' energy. Minimizing the time the arcjet operates in the low mode, minimizes the erosion of the arcjet. In a conventional high performance arcjet, the period in the low mode is in excess of 500 milliseconds.

The arc 30' is driven through the constricted portion 20 by the high flow rate of the propellant gas 14 to the diverging downstream portion 18. The gas expansion upon entering the diverging downstream portion 18 results in a diffuse, increased voltage, low amperage arc 30" which attaches to a surface 34 of the diverging downstream portion 18. The attachment of the diffuse arc 30" represents the termination of the startup of the arcjet and the initiation of steady state operation.

Figure 4:
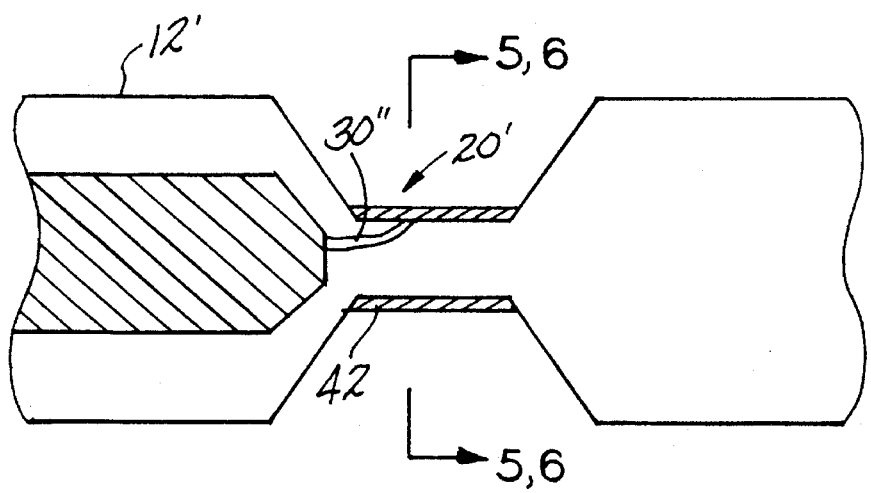
FIG. 4 shows in cross-sectional representation, the arc position when attached to a rail in accordance with the present invention.

The present invention dramatically reduces the arc transit time through the constricted portion 20, reducing arc erosive starts. FIG. 4 illustrates in cross-sectional representation an anode 12' of the invention. The constricted portion 20' includes at least one conductive rail 42 which is effective to preferentially receive the arc 30'. Utilizing conductive rails 42, reduces the duration of the low mode to under about 20 milliseconds. The operation of the rail 42 will become more apparent from FIGS. 5 and 6 which illustrate the constricted portion 20' of FIG. 4 in cross-sectional representation.

Figure 5:
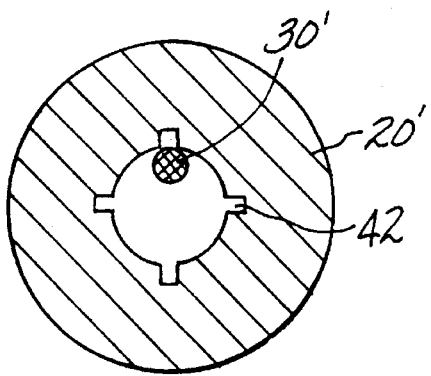
FIG. 5 shows in cross-sectional representation, a first embodiment of a rail in accordance with the invention.

FIG. 5 illustrates a first embodiment of conductive rails 42. The conductive rails 42 are one or more slots machined into the constricted portion 20' with the slot edges flush with the wall of the constricted portion. While one slot could be used, a plurality of symmetrically disposed slots are preferred to obtain stable operation of the arc. The arc 30' attaches to an edge of a slot due to the higher electric field strength at the edge of the rails 42. Accordingly, a sharp edge is preferred over a rounded edge. The width and depth of the rails 42 is less important than the sharpness of the edge. For a constricted portion 20' having a diameter of about 0.51 mm (0.020 inch), a width and depth of from about 0.025 mm to about 0.13 mm (0.001–0.005 inch) is preferred, with a width and depth of from about 0.051 mm to about 0.076 mm (0.002–0.003 inch) being most preferred.

In addition to providing sharp corners for attachment of the arc 30', the rails also form channels for the preferential flow of the propellant gas to accelerate the arc 30' through the constricted portion.

Figure 6:
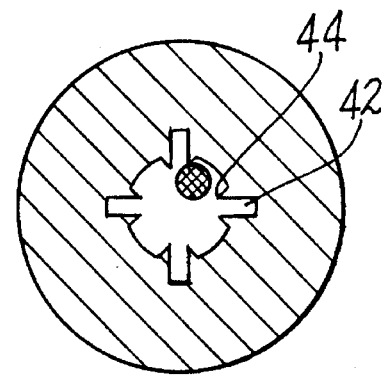
FIG. 6 shows in cross-sectional representation, a second embodiment of a rail in accordance with the present invention.

To enhance the electric field strength at the edge of the rails 42, a knife edge or ridge 44 raised above the wall of the constricted portion as illustrated in FIG. 6 may be incorporated either with or without adjacent slots. To prevent interference with operation of the arcjet, the knife edge 44 should have a height of from about 0.025 mm to about 0.051 mm (0.001–0.002 inch).

Bulging is a result of a non-uniform temperature gradient through the constricted portion. This temperature gradient is illustrated in the thermal model illustrated in FIG. 7. During steady state operation, the temperature in the regions identified by letters A through L are as illustrated in Table 1 for a prior art anode of the type illustrated in FIG. 1.

TABLE 1

| Location | Degrees F. | Degrees C. |
| --- | --- | --- |
| A | 1440 | 782 |
| B | 1767 | 963 |
| C | 1980 | 1082 |
| D | 2186 | 1196 |
| E | 2454 | 1345 |
| F | 2400 | 1316 |
| G | 2388 | 1308 |
| H | 2236 | 1224 |
| I | 2176 | 1190 |
| J | 2123 | 1163 |
| K | 2048 | 1119 |
| L | 2262 | 1294 |

The temperature gradient between the body 39, L, and the constricted portion 20, E, is 51° C. over a distance, DD, of about 1.3 mm (0.05 inch). This thermal gradient results in a high stress concentration within the constricted portion 20 causing a bulge.

Figure 8:
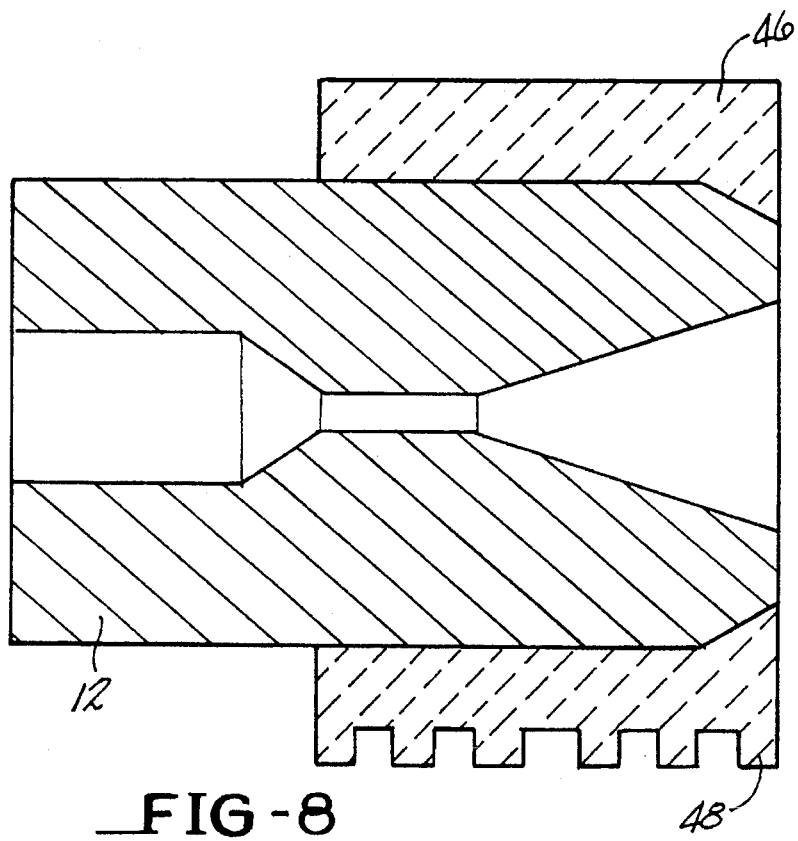
FIG. 8 shows in cross-sectional representation a means to increase the emission of heat from the anode.

By reducing the overall temperature, Applicant's anode designs reduce the bulge. FIG. 8 illustrates a first embodiment. When the anode 12 is manufactured from a conventional material such as thoriated tungsten (2% by weight thorium, balance tungsten) the emissivity, the ability of a surface to emit radiant energy compared to that of a black body at the same temperature and same area, is about 0.5. A sheath 46 formed from a material having an emissivity greater than 0.5, applied about a portion of the anode reduces the thermal gradient. By increasing the emissivity, the enhanced radiation capability results in an overall reduction in the temperature of the body. This allows the strength of the material to remain high, further resisting the inward bulging of material.

Preferably, the sheath 46 covers the portions of the anode having the highest temperature, the constricted portion and/or the diverging downstream portion. Suitable materials for the sheath 46 include silicon carbide and graphite, both having an emissivity of about 0.9. The radiation of heat is further enhanced by forming fins 48 in either the sheath 46 or in the anode 12 to increase the area available for heat exchange. The advantage of this approach is illustrated in FIG. 2 which uses the lettering of FIG. 7 for a modeled arcjet thruster having an emissivity coating equal to 0.9999.

TABLE 2

| Position | Degrees F. | Degrees C. |
| --- | --- | --- |
| C | 1883 | 1030 |
| D | 1985 | 1084 |
| E | 2093 | 1145 |
| F | 2209 | 1210 |
| G | 2166 | 1185 |
| H | 2135 | 1168 |
| I | 1952 | 1066 |
| J | 1912 | 1045 |
| K | 1866 | 1018 |

TABLE 2-continued

| Position | Degrees F. | Degrees C. |
| --- | --- | --- |
| L | 1909 | 1043 |

The temperature gradient between positions E and L is 102° C. as compared to the 51° C. temperature differential of the prior art. However, since the ability to resist bulging is directly related to the temperature of the material, the lower temperature at position E (1145° C. in Table 2, 1345° C. in Table 1) corresponds to a reduced bulge.

Figure 9:
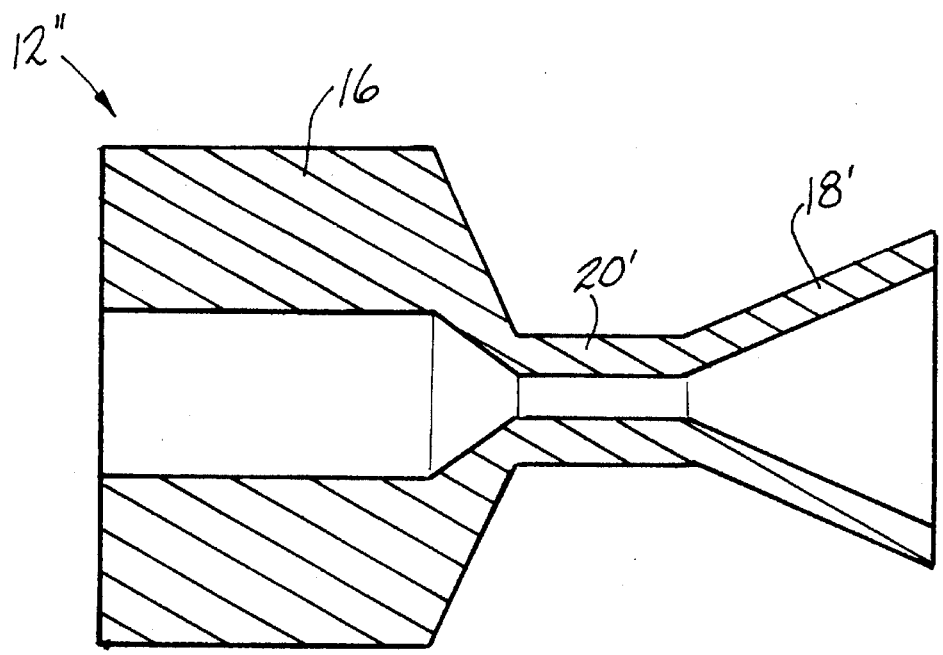
FIG. 9 shows in cross-sectional representation a means to facilitate uniform expansion of the anode.

FIG. 9 illustrates in cross-sectional representation an anode 12" in which the walls of the constricted portion 20' and the diverging downstream portion 18' are thinned. In a conventional high performance arcjet thruster, the thickness is about 12.7 mm (0.5 inch). In the thinned embodiment, the thickness is from about 1.3 mm to about 5.1 mm (0.05–0.20 inch) and preferably from about 1.3 mm to about 2.5 mm (0.05–0.10 inch). Since the materials are thinner, the stress generated in the constricted region 20 is reduced. The reduced thickness is achieved either by the removal of material as illustrated in FIG. 9 or by the formation of internal or external slots. The amount of material removed is dependent on the anode configuration. When slots are utilized, an effective amount of metal removed is that which minimizes bulging while retaining anode integrity during operation. Preferably, from about 10% to about 50% of the material is removed.

Figure 7:
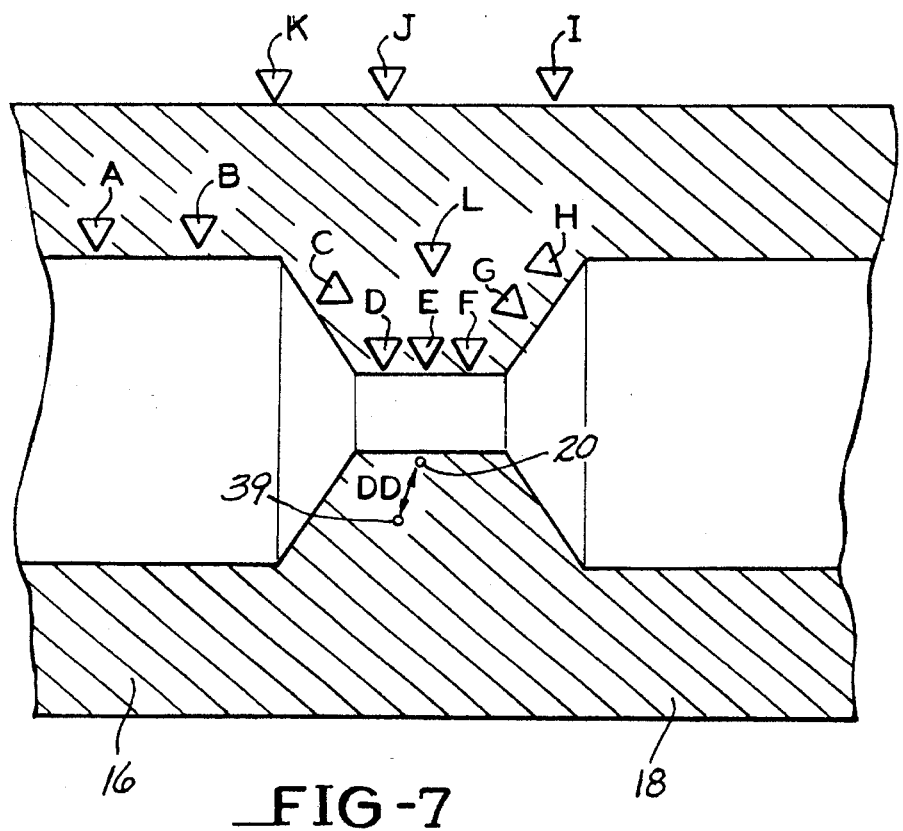
FIG. 7 shows in cross-sectional representation, temperature measurement sites in a thermal gradient model of the constrictor.

Table 3 shows the temperature following the removal of material from the constricted portion and diverging downstream portion of an anode having an emissivity of 0.5 using the lettering of FIG. 7. While the reduced thickness reduces the stress at the intersection, this benefit is countered by the higher temperature at position E (1498° C. in Table 3, 1345° C. in Table 1).

TABLE 3

| Position | Degrees F. | Degrees C. |
| --- | --- | --- |
| C | 2477 | 1358 |
| D | 2617 | 1435 |
| E | 2731 | 1498 |
| F | 2851 | 1565 |
| G | 2785 | 1529 |
| H | 2731 | 1498 |
| I | 2567 | 1408 |
| J | 2546 | 1396 |
| K | 2522 | 1384 |
| L | 2543 | 1395 |

Figure 10:
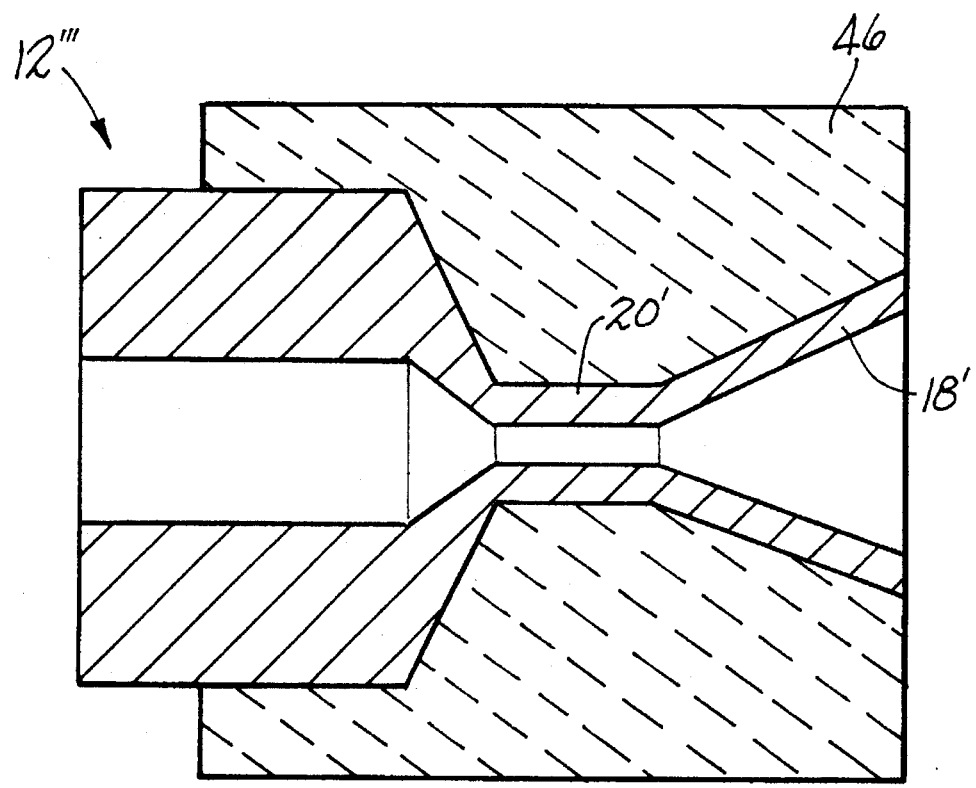
FIG. 10 shows in cross-sectional representation, a means to both increase thermal emission and facilitate uniform expansion of the anode.

FIG. 10 illustrates in cross-sectional representation an anode 12" utilizing both a high emissivity sheath 46 and a reduced thickness constricted portion 20' and diverging upstream portion 18' to achieve the benefits of a thinned body without an increased temperature penalty. This combination is believed to provide the most significant reduction in bulge.

In another embodiment of the invention, the anode is manufactured from a material which will resist bulging. During steady state operation, the temperature in the constricted portion is about 1500° C. While the yield stress of tungsten and 2% thoriated tungsten is insufficient to prevent bulging at this temperature, higher yield strength tungsten alloys may be suitable. The yield strength of 2% thoriated tungsten at 1500° C. is on the order of 200 MPa. Higher yield strength tungsten alloys including tungsten doped with 1–5% rhenium, and tungsten doped with aluminum-potassium-silicon should be suitable. A preferred tungsten alloy is 3.5%–4.5% by weight rhenium, 0.35 molar percent hafnium carbides and the balance tungsten.

The conductive rails described above, also reduce the formation of a bulge. During steady state operation, the slots deform to compensate for the coefficient of thermal expansion differences due to the thermal gradient.

While the invention has been described in terms of arcjet thrusters, it is equally applicable to other types of arc plasma generators.

The patents set forth in this application are intended to be incorporated in their entireties by reference herein.

It is apparent that there has been provided in accordance with this invention an anode for an arcjet thruster which fully satisfies the objects, means and advantages set forth hereinbefore. While the invention has been described in combination with the embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. An anode for an arcjet thruster, comprising:

a converging upstream portion;

a diverging downstream portion; and a constricted portion disposed between said upstream portion and said downstream portion, said constricted portion having a plurality of symmetrically disposed conductive rails having both a width and a depth of from about 0.025 mm to about 0.13 mm effective to preferentially receive an arc and to conduct from said arc from said converging upstream portion to said diverging downstream portion.

2. The anode of claim 1 wherein an edge of said conductive rails is flush with the wall of said constricted portion.

3. An anode for an arc jet thruster, comprising:

a converging upstream portion;

a diverging downstream portion; and a constricted portion disposed between said upstream portion and said downstream portion, said constricted portion having a plurality of symmetrically disposed conductive rails with an edge of said rails raised above the wall of said constricted portion effective to preferentially receive an arc and to conduct said arc from said converging upstream portion to said diverging downstream portion.

4. The anode of claim 3 wherein an edge of said conductive rails is raised by from about 0.025 mm to about 0.05 mm above the wall of said constricted portion.

5. An anode for an arcjet thruster, comprising:

a converging upstream portion;

a diverging downstream portion;

a substantially uniform thickness constricted region disposed between said upstream portion and said downstream portion, wherein the thickness of said constricted region is from about 10% to about 50% less than the thickness of said converging upstream portion; and a sheath having a thermal emissivity greater than the thermal emissivity of said anode covering at least a portion of said anode.

6. The anode of claim 5 wherein said sheath has a thermal emissivity greater than 0.5.

7. The anode of claim 6 wherein said sheath is formed from a material selected from the group consisting of silicon carbide, graphite and mixtures thereof.

8. The anode of claim 5 wherein the thickness of said diverging downstream portion and of said constricted region is from about 1.3 mm to about 5.1 mm.

9. The anode of claim 8 wherein the thickness of said diverging downstream portion and of said constricted region is from about 1.3 mm to about 2.5 mm.

10. An anode for an arcjet thruster, comprising:

a converging upstream portion;

a diverging downstream portion;

a constricted region disposed between said upstream portion and said downstream portion, wherein said anode is formed from a material having a yield strength greater than 200 MPa at a temperature of 1500° C.; and a sheath having a thermal emissivity greater than 0.5 covering at least a portion of said anode.

11. The anode of claim 10 wherein said sheath is formed from a material selected from the group consisting of silicon carbide, graphite and mixtures thereof.

12. The anode of claim 11 wherein the thickness of said diverging downstream portion and/or said constricted portion is less than the thickness of said converging upstream portion.

13. An anode for an arcjet thruster, comprising:

a converging upstream portion;

a diverging downstream portion;

a constricted region disposed between said upstream portion and said downstream portion, wherein said constricted region contains slots and from about 10% to about 50% of the volume of said constricted region is contained within said slots; and a sheath having a thermal emissivity greater than the thermal emissivity of said anode covering at least a portion of said anode.

14. The anode of claim 13 wherein said sheath has a thermal emissivity greater than 0.5.

15. The anode of claim 14 wherein said sheath is formed from a material selected from the group consisting of silicon carbide, graphite and mixtures thereof.

* * * * *

UNITED STATES PATENT AND TRADEMARK OFFICE
CERTIFICATE OF CORRECTION

PATENT NO. : 5,464,961
DATED : November 7, 1995
INVENTOR(S) : Lichon

It is certified that error appears in the above-indentified patent and that said Letters Patent is hereby corrected as shown below:

On the Title Page:

[45] delete "Lichon" and insert ---Lichon et al.---

[75] after "Paul G. Lichon, Bothell, Wash." please insert ---Randall S. Aadland, Kirkland, Wash.---

Signed and Sealed this

Seventh Day of May, 1996

Attest:

BRUCE LEHMAN

Attesting Officer

Commissioner of Patents and Trademarks